United States Patent
Katagiri et al.

(10) Patent No.: US 7,137,476 B2
(45) Date of Patent: Nov. 21, 2006

(54) VEHICLE STEERING APPARATUS AND MOUNTING STRUCTURE FOR MOUNTING THE APPARATUS ON VEHICLE

(75) Inventors: Akira Katagiri, Kasugai (JP); Masaaki Hamada, Kounan (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 11/083,998

(22) Filed: Mar. 21, 2005

(65) Prior Publication Data

US 2005/0236216 A1    Oct. 27, 2005

(30) Foreign Application Priority Data

Mar. 26, 2004 (JP) ............... 2004-093674
Mar. 15, 2005 (JP) ............... 2005-074102

(51) Int. Cl.
  *B62D 5/16* (2006.01)
  *B62D 5/04* (2006.01)
(52) U.S. Cl. ............... 180/402; 180/443; 180/444
(58) Field of Classification Search ............... 180/402
  See application file for complete search history.

(56) References Cited

U.S. PATENT DOCUMENTS 4,723,569 A * 2/1988 Ellis ............... 137/385
6,644,432 B1 * 11/2003 Yost et al. ............... 180/444
2003/0192734 A1 * 10/2003 Bugosh ............... 180/444
2003/0220727 A1   11/2003 Husain et al.

FOREIGN PATENT DOCUMENTS

| JP | A-2001-213342 | 8/2001 |
| JP | A-2003-137124 | 5/2003 |
| JP | A-2003-165460 | 6/2003 |

OTHER PUBLICATIONS

Sumio Motoyama; "The Possibilities of Steer-by-wire on Vehicle Dynamics"; *Jidosha Gijutsu Kai*; vol. 57: pp. 39-43; Feb. 2003.

* cited by examiner

*Primary Examiner*—Lesley D. Morris
*Assistant Examiner*—Marlon Arce-Diaz
(74) *Attorney, Agent, or Firm*—Oliff & Berridge PLC (57) ABSTRACT

A mounting structure for mounting a steer-by-wire vehicle steering apparatus on a vehicle body side, comprising: a housing for rotatably retaining therein one end of a steering shaft of the steering apparatus, while retaining therein an actuator for exerting reactive force in order to impart reactive force in response to turning of an operating member fastened to an other end of the steering shaft that projects from the housing and rotatable together with the steering shaft; and a plurality of mounting portions disposed about a turning axis of the operating member so as to extend diametrically outwardly, the mounting portions fastened at respective fastener portions thereof to a vehicle body side at multiple locations, at least one of the fastener portions of the mounting portions is fastened to the body side via a rubber elastic body so that the housing is elastically supported on the body side.

10 Claims, 6 Drawing Sheets

VEHICLE STEERING APPARATUS AND MOUNTING STRUCTURE FOR MOUNTING THE APPARATUS ON VEHICLE

INCORPORATED BY REFERENCE

The disclosure of Japanese Patent Application No. 2004-093674 filed on Mar. 26, 2004 and No. 2005-074102 filed on Mar. 15, 2005, each including the specification, drawings and abstract is incorporated herein by reference in its entirety.

BACKGROUND OF THE INVENTION

1. Field of the Invention

The present invention relates to a steering apparatus for use in a vehicle, which apparatus employs a "steer-by-wire" system in which mechanical linkages between wheels and control components for controlling the wheels in a vehicle are replaced with electrical signals. The present invention is also relates to a mounting structure for mounting the apparatus on the vehicle.

2. Description of the Related Art

Conventional steering mechanisms developed and tested to date include those incorporating steer-by-wire technology, such as the mechanism described in non-patent Citation (Sumio Motoyama, "Steer-by-wire and Vehicle Motion Control" Jidosha Gijutsu Kai, February 2003, Vol. 57, pp. 39–43), for example. The greatest concern regarding such systems is how to ensure reliability in the event of system malfunction. A number of types have been proposed, such as one that switches over to conventional mechanical linkage in the event of a system malfunction, or one equipped with a backup actuator. In JP-A-2001-213342, JP-A-2003-137124 and JP-A-2003-165460, for example, these have been disclosed steering apparatus of various kinds employing steer-by-wire systems.

Each of these implementations of steer-by-wire technology has the advantage that by replacing steering control with electrical signals, it is relatively easy to make the devices compatible with ITS (Intelligent Traffic Systems), which dramatically expand controllability of maneuver stability control of vehicles. Additionally, eliminating mechanical linkages between steering control components and the wheels has the promise of reducing direct transmission of vibration from the wheels and engine.

However, the steering wheel or other control component that transmits the intention of the driver must be fastened to and supported by the vehicle body side, and thus in the same way as before, input load from power train components and the road surface as well as vibration amplified by various kinds of resonance systems belonging to the vehicle body side are transmitted from fastener portions to the control component, creating an unpleasant feeling for the driver.

SUMMARY OF THE INVENTION

It is therefore a first object of this invention to provide a vehicle steering apparatus capable of effectively attenuating unpleasant noise and vibration transmitted from the body side, and it is a second object of the invention to provide a vehicle steering apparatus affording to the driver good operating feel, and able to effectively reduce unpleasant noise vibration transmitted from the body side. It is a third object of the invention to provide a mounting structure for mounting a vehicle steering apparatus on the body side of the vehicle in a vibration isolating manner.

The above and/or optional objects of this invention may be attained according to at least one of the following aspects of the invention. It is to be understood that the principle of the invention is not limited to these aspects and their preferred forms of the invention and combinations of the technical features, but may otherwise be recognized based on the teachings of the present invention disclosed in the entire specification and drawings or that may be recognized by those skilled in the art in the light of the present disclosure in its entirety.

A first aspect of the invention provides a steer-by-wire vehicle steering apparatus comprising: a housing having mounting portions adapted to be fastened at respective fastener portions thereof to a vehicle body side at multiple locations; a steering shaft one end of which is rotatably retained within the housing; an operating member fastened to an other end of the steering shaft that projects from the housing, and rotatable together with the steering shaft; and a control portion electrically connected to a sensor that senses the manipulated variable of the operating member, for controlling steering of the wheels in response to operation of the operating member, wherein at least one of the fastener portions of the mounting portions is arranged to be fastened to the body side via a rubber elastic body so that the housing is elastically supported on the body side.

In the vehicle steering apparatus according to this mode, since a rubber elastic body will be disposed between the body side and the fastener portion at a minimum of one location of the mounting portions of the housing, transmission of unpleasant noise and vibration from the body side to the operating member via the housing mounting portions is effectively reduced by means of elastic action on the part of the rubber elastic body.

Preferably, the rubber elastic body will be disposed selectively to the one of the fastener portions that is to be attached to a location having a lowest rigidity among locations on the body side at which the mounting portions are fastened, or to the one of the fastener portions of the mounting portions having the lowest rigidity among the mounting portions. The body to which the mounting portions are fastened is typically selected from highly rigid structural members or panel members. However, since in some instances, depending on the structure or wall thickness of such members rigidity may differ by location, or for a single given panel member rigidity may differ by location, such members do not necessarily have uniform rigidity at all locations.

Regarding the mounting portions, on the other hand, there are instances in which all fastener portions (based on the center point of the fastener portion) are not situated equidistant from the housing body. In such instances as well, the fastening portions of the mounting portion may vary in length from the housing body so that portions extending to the fastening portions do not always have uniform rigidity. Areas of low rigidity in the body or mounting portions give rise to greater vibration for a given input, and thus tend to become principal points of noise vibration transmission. Thus, by selectively disposing rubber elastic bodies at these low-rigidity locations, transmission of unpleasant noise vibration from the body side to the mounting portion side can be effectively reduced.

A second aspect of the invention provides a steer-by-wire vehicle steering apparatus comprising: a housing having mounting portions adapted to be fastened at respective fastener portions thereof to a vehicle body side at multiple locations; a steering shaft one end of which is rotatably retained within the housing; an operating member fastened to an other end of the steering shaft that projects from the housing, and rotatable together with the steering shaft; and a control portion electrically connected to a sensor that senses the manipulated variable of the operating member, for controlling steering of the wheels in response to operation of the operating member, wherein the fastener portions of the mounting portions are all situated respective positions on a circumference about an turning axis of the operating member, and the housing is elastically supported with the fastener portions of the mounting portions all arranged to be fastened to the body side via rubber elastic bodies, while the rubber elastic bodies in the all fastener portions exhibit a highest overall spring constant in a direction of turning operation of the operating member among every axis-perpendicular directions of the operating member.

In the vehicle steering apparatus according to the second aspect of the invention, since rubber elastic bodies disposed between the body and the fastener portions at all locations of the mounting portions of the housing, transmission of unpleasant noise vibration from the body side to the operating member via the housing mounting portions is effectively reduced by means of elastic action on the part of the rubber elastic body. Additionally, since the rubber elastic bodies are imparted overall with the highest spring constant in the direction of turning operation of the operating member among every axis-perpendicular directions, the driver is assured with a high level of rigidity of the operating member in the turning operation direction, affording to the driver good operating feel.

In the preferred practice, the fastener portions of the mounting portions are situated outwardly from a circle of rotation described by a grip portion of the operating member during turning of the operating member, with respect the turning axis of the operating member (typically coincident with the axis of rotation of the steering shaft). Here, the grip portion of the operating member refers to the portion of the operating member that the driver grips with the hands when turning the operating member. While the grip portion is typically circular in shape, it would be possible to employ any of various other shapes such as a H shape, U shape, " $\wedge$ " shape, or the like. With this arrangement, higher rigidity in the turning direction of the operating member is readily assured. In this case, rigidity is higher the greater the distance of the fastener portion is from the turning axis of the operating member. Herein, when specifying fastener portion location, distance and so on, this shall be based on the center point of the fastener portion.

Figure 8:
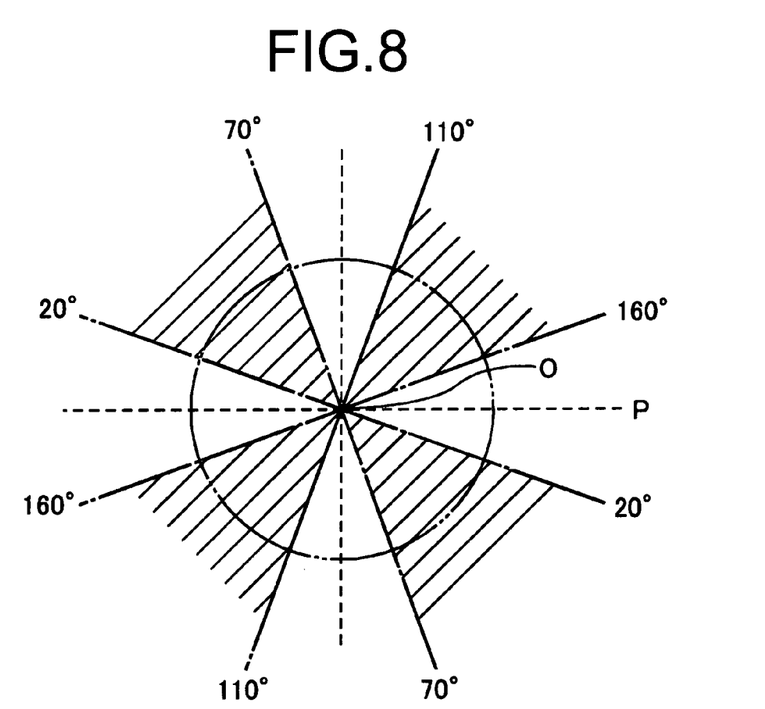
FIG. 8 is an illustration suitable for explaining arrangements of fixture portions of mounting portions of the housing of FIG. 5.

Preferably, the fastener portions of the mounting portions are established within ranges of 20°–70° and 110°–160° (the hatched portions in FIG. 8) from a horizontal axis P in the clockwise direction about a turning axis O of the operating member, as shown in FIG. 8. With this arrangement, rubber elastic bodies are disposed such that rigidity in the turning direction of the operating member and rigidity in the vehicle vertical and lateral directions are separated. By means of this, stiffer rigidity is produced in the operating member turning direction to create good operating feel, while softer rigidity is produced in the vehicle vertical direction and lateral direction to afford good reduction in noise and vibration.

In another preferred practice, where L is a radial distance from the turning axis of the operating member to each of the fastener portions and K is a spring constant of each of the rubber elastic bodies in the turning direction of the operating, is met an equation as follow:

$$K_1 \times L_1 = K_2 \times L_2 = \ldots = K_n \times L_n \qquad \text{(Eq. 1)}$$

Figure 9:
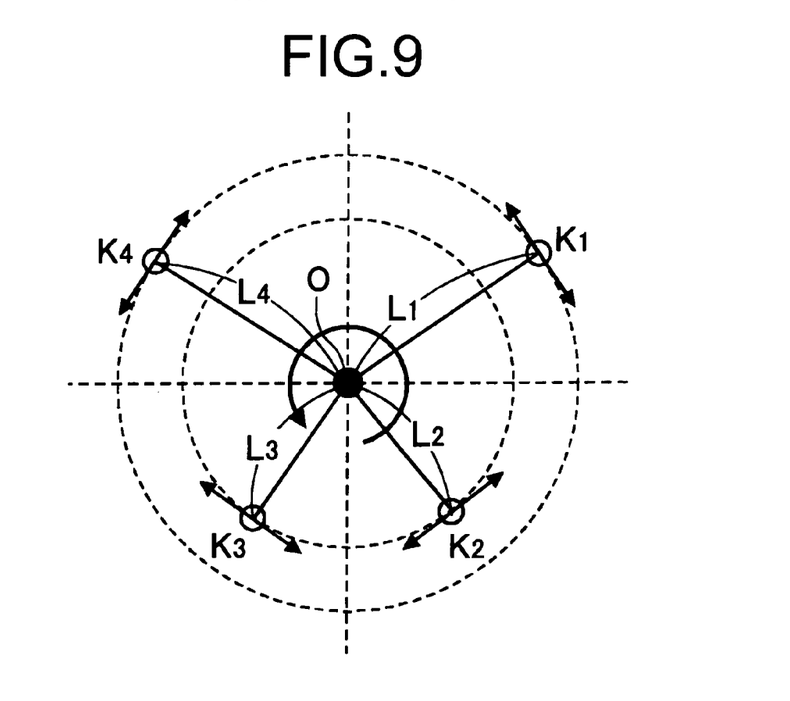
FIG. 9 is another illustration suitable for explaining arrangements of fixture portions of mounting portions of the housing of FIG. 5.

In some instances, it will not be possible to establish equal distances from the operating member turning axis to each of the fastener portions; in such instances, the spring constant of each rubber elastic body is established so as to fulfill Equation 1 indicated above. For instance, where these are four fastener portions, the distance L from the operating member turning axis O to each of the fastener portions and the spring constants K of the rubber elastic bodies will be established such that $K_1 \times L_1 = K_2 \times L_2 = K_3 \times L_3 = K_4 \times L_4$, as shown in FIG. 9. With this arrangement, displacement of the steering apparatus due to input in the operating member turning direction is regulated in the turning direction only, and the occurrence of translational motion of the operating member (steering apparatus), which can bring discomfort to the driver, can be prevented.

In Equation 1 indicated above, preferably, the relationships $L_1 = L_2 = \ldots = L_n$ and $K_1 = K_2 = \ldots = K_n$ will be met. That is, the fastener portions of the mounting portions will be situated at equal distance from the turning axis of the operating member, and spring constant of the rubber elastic bodies will be the same in the operating member turning direction. With this arrangement, fastening conditions of fastener portions to the body are made more uniform, so that translational motion of the operating member (steering apparatus), which can bring discomfort to the driver, can be prevented more consistently.

In the further preferred practice, the rubber elastic bodies entirely exhibit a spring constant in the vertical direction of the vehicle that is about one-half or less than a spring constant in the turning direction of the operating member. With this arrangement, stiffer rigidity is produced in the operating member turning direction to create good operating feel, while softer rigidity is produced in the vehicle vertical direction, affording good reduction in noise and vibration.

As the control portion and sensor employed in the first and second aspects of the invention, there may be employed components selected appropriately from among those known in art for use in steer-by-wire steering apparatus and the like.

A third aspect of the invention provides a mounting structure for mounting a steer-by-wire vehicle steering apparatus on a vehicle body side, comprising: a housing for rotatably retaining therein one end of a steering shaft of the steering apparatus, while retaining therein an actuator for exerting reactive force in order to impart reactive force in response to turning of an operating member fastened to an other end of the steering shaft that projects from the housing and rotatable together with the steering shaft; and a plurality of mounting portions disposed about a turning axis of the operating member so as to extend diametrically outwardly, the mounting portions adapted to be fastened at respective fastener portions thereof to a vehicle body side at multiple locations, at least one of the fastener portions of the mounting portions is fastened to the body side via a rubber elastic body so that the housing is elastically supported on the body side.

According to the first aspect of the invention, since the housing is elastically supported by a fastener portion, at a minimum of one location of the mounting portions fastened to the body via a rubber elastic body, transmission of unpleasant noise vibration from the body to the housing mounting portions can be effectively reduced.

According to the second aspect of the invention, since the housing is elastically supported by fastener portions at all locations of the mounting portions, fastened onto the body via rubber elastic bodies, and additionally since each rubber elastic body is imparted with high spring constant in the direction of turning of the operating member, the driver can be afforded good operating feel, and transmission of unpleasant noise vibration from the body side to the operating member via the housing mounting portions can be effectively reduced.

According to this aspect, the mounting structure suitable for mounting a steer-by-wire vehicle steering apparatus on a vehicle body side in a vibration-isolating manner can be advantageously provided. The configuration of the housing as well as arrangement of the mounting portions of the housing and the like may be suitably determined depending on a kind of steer-by-wire vehicle steering apparatus to be mounted or alternatively on the shape and characteristics of the area of the vehicle body on which the fixture portions of the mounting portions will be fixed. Preferably, the mounting structure according to this aspect of the invention may be embodied by incorporating any one or more of the same arrangements as described above with respect to the steer-by-wire vehicle steering apparatuses according to the first and second aspects of the invention, for thereby exhibiting respective advantageous features like in the steering apparatus.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
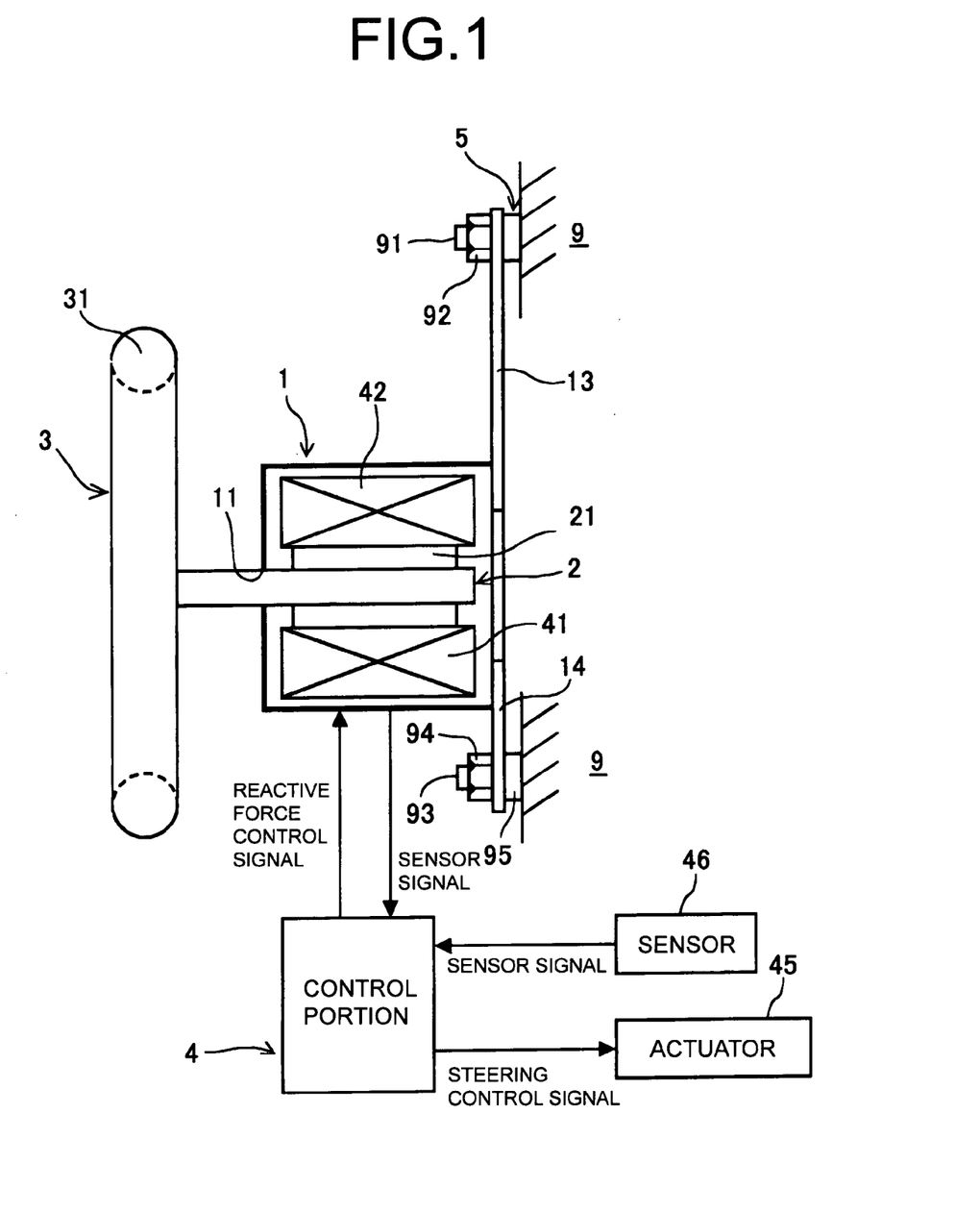
FIG. 1 is a schematic illustration of a vehicle steering system of construction according to a first embodiment of the invention.
Figure 2:
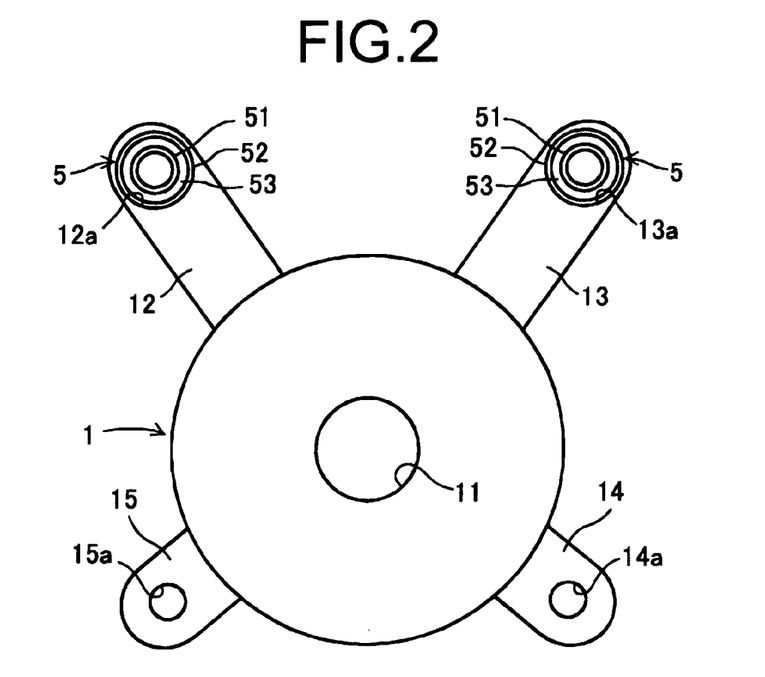
FIG. 2 is a top plane view of a housing of construction according to the first embodiment of the invention.
Figure 3:
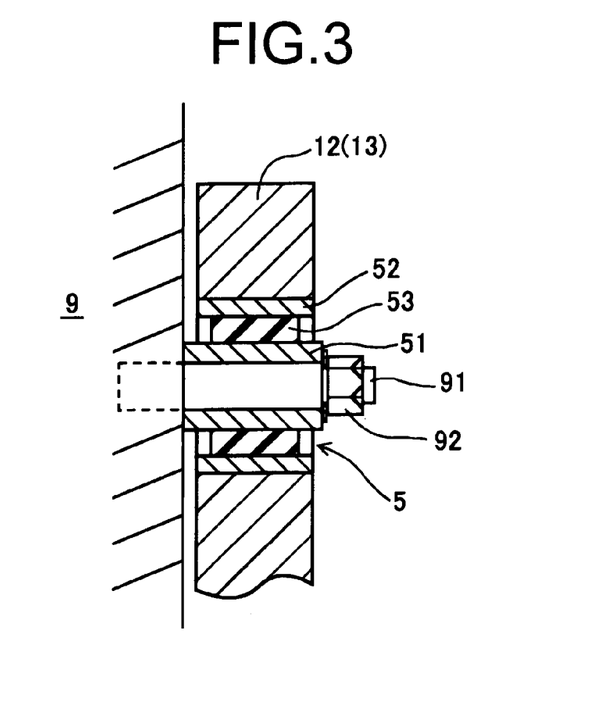
FIG. 3 is a cross sectional view showing a state where a fixture portion of a mounting portion of the housing of FIG. 2 is affixed to a vehicle body.

FIG. 1 is a schematic illustration of a vehicle steering apparatus of construction according to a first embodiment of the invention. FIG. 2 is a top plane view of a housing according to this embodiment, and FIG. 3 is a sectional view depicting mounting of the housing according to this embodiment.

The steering apparatus of this embodiment employs a steer-by-wire system. As shown in FIGS. 1–3, the apparatus comprises a housing 1 having mounting portions 12–15 of which the fastener portions at two out of four locations are fastened to a body 9 via rubber mounts 5, 5 (including rubber elastic bodies 53); a steering shaft 2 one end of which is rotatably retained within the housing 1; an operating member which is a steering wheel 3 fastened to the other end of the steering shaft 2 that projects from the housing 1; and a control portion 4 electrically connected to a sensor 41 that senses a manipulated variable of the steering wheel 3, for controlling steering of the wheels (not shown) in response to operation of the steering wheel 3.

The housing 1 is of cylindrical shape closed at both ends, by means of a lid or the like (not specifically illustrated), and is provided in the center portion of its wall at one end by a circular hole 11 through which the steering shaft 2 is passed. On the wall at the other end of the housing 1 are integrally formed four mounting portions 12-15 that project diametrically outward from the outer peripheral face. For reasons related to mounting location on the body 9, the two mounting portions 12, 13 situated at the upper side of the housing 1 are formed so as to be longer than the two mounting portions 14, 15 disposed on the lower side, and are somewhat lower in rigidity than the two mounting portions 14, 15.

The locations on the body 9 at which the two mounting portions 12, 13 are fastened are somewhat lower in rigidity than the locations on the body 9 at which the other two mounting portions 14, 15 are fastened. At the distal ends of the longer mounting portions 12, 12 are disposed mounting holes 12a, 13a perforating them in the thickness direction (axial direction of housing 1), with the rubber mounts 5, 5 being installed press-fit into these mounting holes 12a, 13a.

The rubber mounts 5, 5 have round cylindrical rubber elastic bodies 53, 53 interposed between inner cylinder fittings 51, 52 and outer cylinder fittings 52, 52 in such a way as to integrally link the two fittings 51, 52. As shown in FIG. 3, the mounting portions 12, 13 are each fixed by fitting the bore of the inner cylinder fitting 51 of the rubber mount 5 onto a bolt shaft 91 projecting from a predetermined area of the body 9, and then clamping the two end faces of the inner cylinder fitting 51, 51 with a nut 92 threaded onto the distal end of the bolt shaft 91.

At the distal ends of the mounting portions 14, 15, on the other hand, there are disposed through-holes 14a, 15a through which a mounting bolt 93 is passed. However, no rubber mounts or the like are installed in these through-holes 14a, 15a. Thus, the mounting portions 12, 13 are each fixed by fitting a metal seating 95 onto a bolt shaft 93 projecting from a predetermined area of the body 9, then fitting on the through-hole 14a, 15a, and clamping the two faces of the mounting portion 14, 15 with a nut 94 threaded onto the distal end of the bolt shaft 93.

The steering shaft 2 is disposed in a generally coaxial arrangement with the housing 1, with one end thereof rotatably retained by a bearing 21 disposed within the housing 1. The other end of the steering shaft 2 projects to the exterior of the housing 1 through the circular hole 11.

The steering wheel 3 has a boss portion (not shown) situated in the center, and an annular grip portion 31 linked to the boss portion by a number of spokes (not shown) extending radially outward from the boss portion. This steering wheel 3 is connected by means of fastening the boss portion to the other end of the steering shaft 2 which projects out from the housing 1, with the turning axes of the steering wheel 3 and the steering shaft 2 being coaxial. With this arrangement, it is possible to turn the steering wheel 3 together with the steering shaft 2, about the turning axis of the steering shaft 2.

The control portion 4 incorporates an electronic control unit (ECU) installed on-board the vehicle. This control portion is electrically connected by means of wiring to a sensor 41 (e.g. a sensor for detecting turning of the steering wheel) installed within the housing 1 and to an actuator 42 (e.g., a reaction actuator for generating reactive force in order to impart reactive force in response to turning of the steering wheel 3).

This control portion 4 is also electrically connected by means of wiring to an actuator 45 that steers the wheels (e.g. a steering actuator that generates steering force in order to steer the wheels) and to a sensor 46 for sensing steering of the wheels. By means of this arrangement the control portion 4 sends control signals to the actuators 42, 45 on the basis of sensor signals sent to it by the sensors 41, 46, and controls steering of the wheels in correspondence with turning of the steering wheel 3.

The steering apparatus of this embodiment with the arrangement described above is elastically supported with the fastener portions of two mounting portions 12, 13 of the housing 1 fastened onto the body 9 via rubber mounts 5, 5 (rubber elastic bodies 53, 53), whereby transmission of unpleasant noise and vibratoin from the body 9 side to the steering wheel 3 via the mounting portions 12, 13 of the housing 1 can be effectively reduced.

Also, in this embodiment, of the four mounting portions 12–15, the rubber mounts 5, 5 are installed selectively on the two mounting portions 12, 13 having greater length and lower rigidity, and those rubber mounts 5, 5 are selectively situated at areas that, of the areas of the body 9 where the mounting portions 12–15 are fastened, have the lowest rigidity, whereby transmission of unpleasant noise vibration from the body 9 side to the steering wheel 3 can be effectively reduced.

Figure 4:
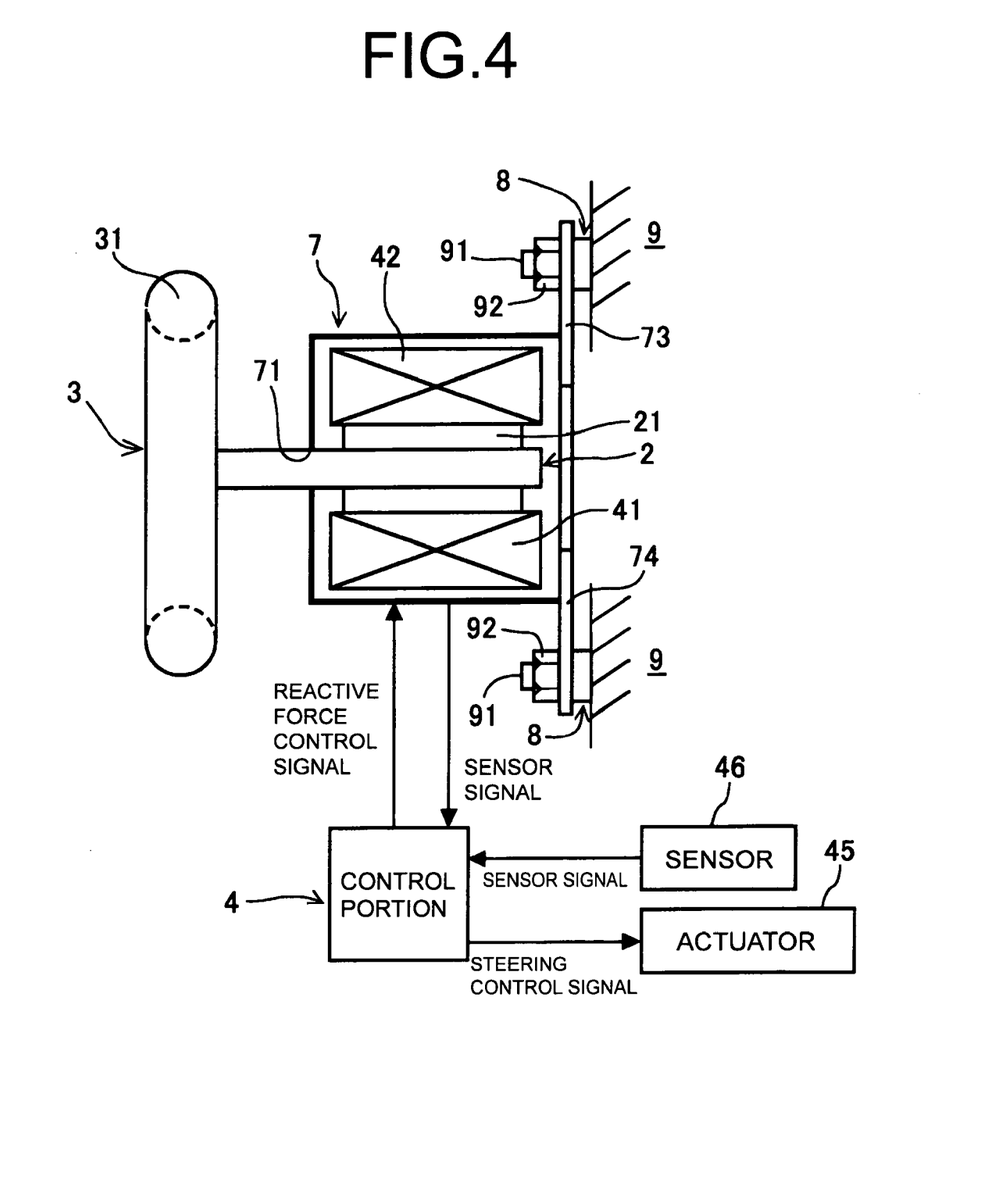
FIG. 4 is a schematic illustration of a vehicle steering system of construction according to a second embodiment of the invention.
Figure 5:
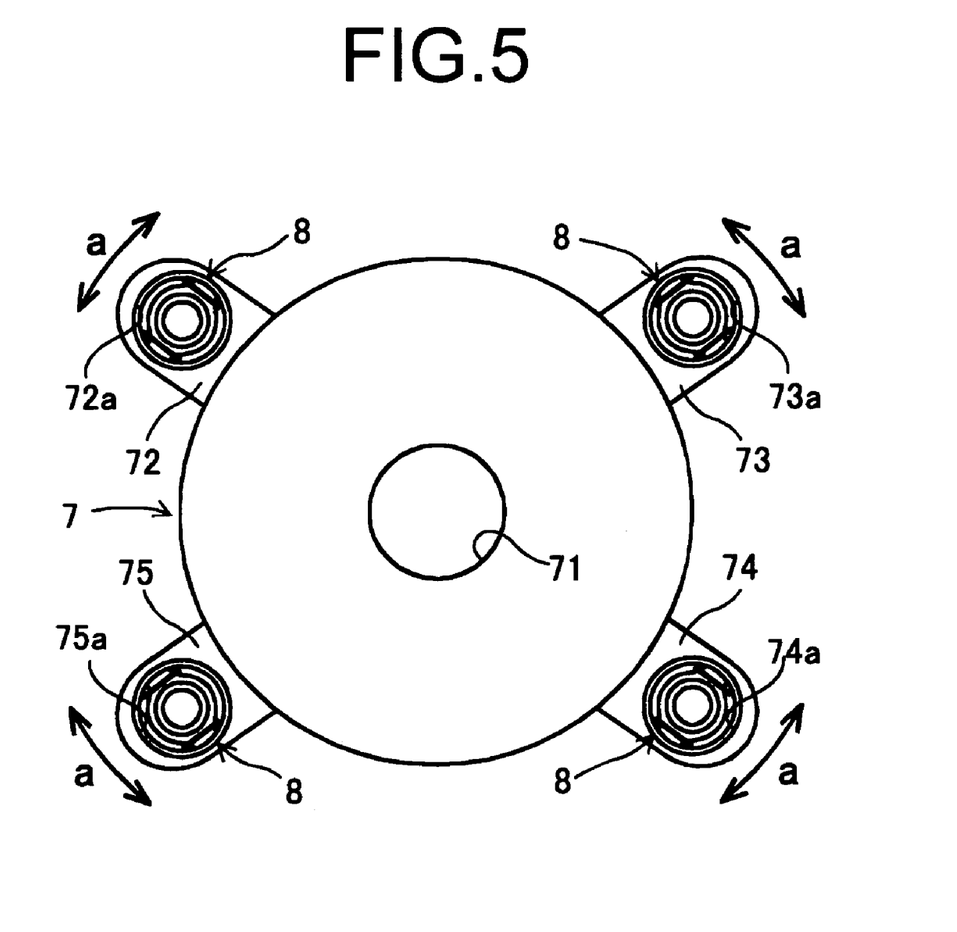
FIG. 5 is a top plane view of a housing of construction according to the second embodiment of the invention.
Figure 6:
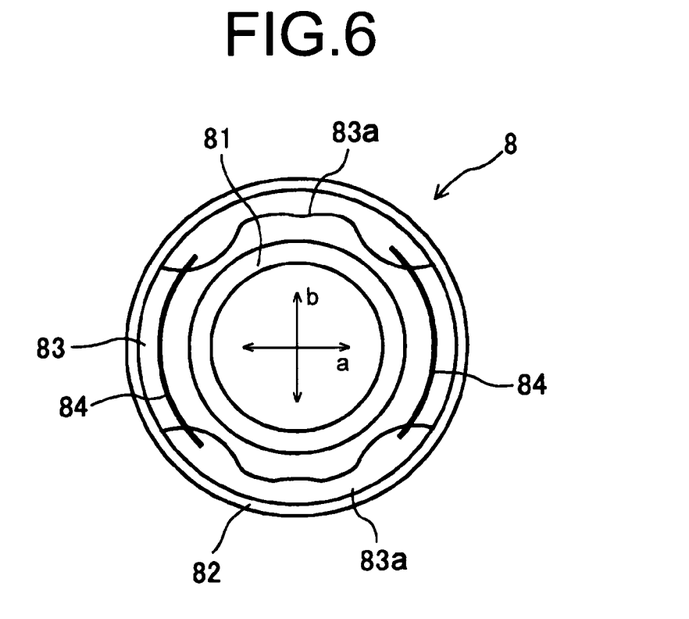
FIG. 6 is a top plane view of an elastic mount employed in the housing of FIG. 5.
Figure 7:
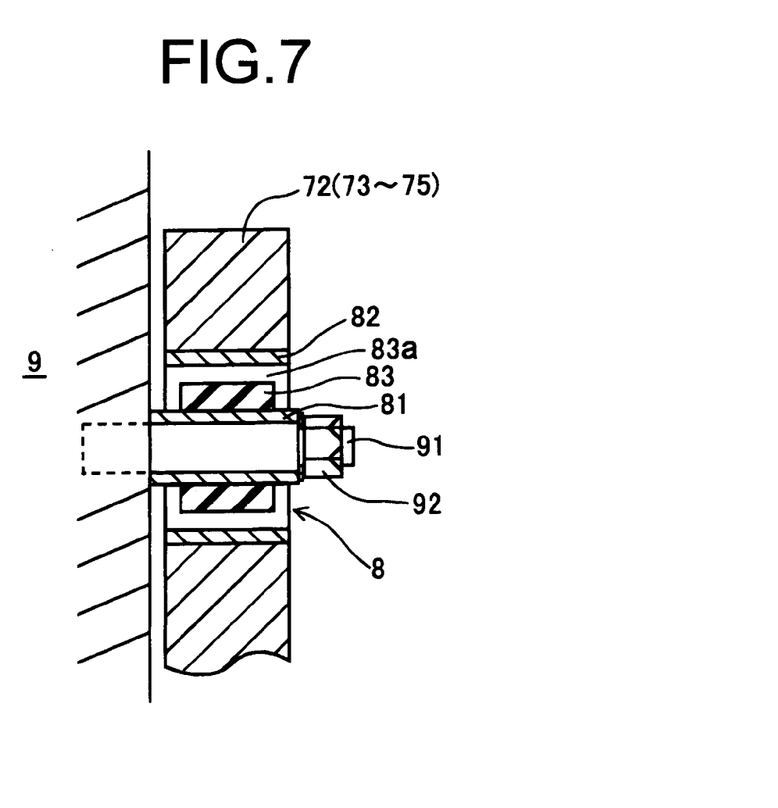
FIG. 7 is a cross sectional view showing a state where a fixture portion of a mounting portion of the housing of FIG. 5 is affixed to a vehicle body.

Referring next to FIG. 4, there is schematically illustrated a vehicle steering apparatus of construction according to a second embodiment of the invention. FIG. 5 is a plan view of the housing according to the embodiment. FIG. 6 is a sectional of the rubber mount according to the embodiment. FIG. 7 is a sectional view depicting mounting of the housing according to the embodiment.

The steering apparatus of this embodiment employs a steer-by-wire system. As shown in FIG. 4, the apparatus comprises a housing 7 having mounting portions 72–75 whose fastener portions at all four locations are fastened to the body 9 via rubber mounts (including rubber elastic bodies) 8. A steering shaft 2 one end of which is rotatably retained within the housing 7, an operating member which is a steering wheel 3 fastened to the other end of the steering shaft 2 that projects from the housing 1, and a control portion 4 electrically connected to a sensor 41 that senses a manipulated variable of the steering wheel 3, for controlling steering of the wheels (not shown) in response to operation of the steering wheel 3.

The apparatus of this embodiment differs from the apparatus of Embodiment 1 in terms of the arrangement and installation method of the mounting portions 72–75 of the housing 7, but the basic arrangement of the steering shaft 2, steering wheel 3, and control portion 4 are the same. Accordingly, components in common with the apparatus of the first embodiment are assigned identical symbols and will not be described in detail, focusing instead on the points of differences in the following description.

The housing 7 is of cylindrical shape closed at both ends by means of a lid or the like (not specifically illustrated), and is provided in the center portion of its wall at one end by a circular hole 71 through which the steering shaft 2 is passed.

On the wall at the other end of the housing 7 are integrally formed four mounting portions 72–75 that project diametrically outward from the outer peripheral face. The mounting portions 72–75 are of the same size and same length. At the distal ends of the mounting portions 72–75 are disposed mounting holes 72a–75a perforating them in the thickness direction (axial direction of housing 7), with rubber mounts 8 being installed press-fit into these mounting holes 72a–75a.

As shown in FIG. 6, the rubber mount 8 has an inner cylinder fitting 81, an outer cylinder fitting 82 disposed coaxially to the outside of the inner cylinder fitting 81, a rubber elastic body 83 interposed between the inner cylinder fitting 81 and the outer cylinder fitting 82 integrally linking the two fittings 81, 82, and a pair of constraining fittings 84, 84 embedded in the rubber elastic body 83. At axis-symmetric locations to either side of the inner cylinder fitting 81 of the rubber elastic body 83 are formed a pair of through-holes 83a, 83a of generally arcuate cross section penetrating through in the axial direction, whereby the spring constant in the direction of opposition of the pair of through-holes 83a, 83a (direction indicated by arrow b in FIG. 6) is adjusted to a lower level. The pair of constraining fittings 84, 84 are embedded at locations phase-shifted by 90° from the pair of through-holes 83a, 83a of the rubber elastic body 83, whereby the spring constant in the direction of opposition of the pair of constraining fittings 84, 84 (direction indicated by arrow a in FIG. 6) is adjusted to a higher level, in comparison with the direction As shown in FIG. 5, the rubber mounts 8 are installed in the mounting holes 72a–75a such that the pair of constraining fittings 84, 84 are positioned along the direction of turning of the steering wheel 3 (direction indicated by arrow a), whereby each mounting is imparted with high spring constant in the direction of turning of the steering wheel 3. That is, the rubber mounts 8 will exhibit an overall spring constant in the turning direction of the steering wheel 3 that is highest among overall spring constants in every axis-perpendicular directions of the turning axis of the steering wheel 3. In this embodiment, with the mounting portions 72-75 installed on the body 9, spring constant in the vertical direction of each rubber elastic body 83 or an overall spring constant of the rubber elastic bodies 83 in the vertical direction of the vehicle, is about one-half or less the spring constant in the direction of turning of the steering wheel 3.

In this way, as shown in FIG. 7, the mounting portions 72–75 having the rubber mounts 8 installed therein are fastened to the body 9 by fitting the bore of the inner cylinder fitting 81 of the rubber mount 8 onto a bolt shaft 91 projecting from a predetermined area of the body 9, and then clamping the two end faces of the inner cylinder fitting 81 with a nut 92 threaded onto the distal end of the bolt shaft 91. With this arrangement, as shown in FIG. 8, the fastener portions of the mounting portions 72–75 (based on the center location of each rubber mount 8) are situated within ranges of 20°–70° and 110°–160° (the hatched portions in FIG. 8) from a horizontal axis P in the clockwise direction about the turning axis O of the steering wheel 3. The fastener portions of the mounting portions 72–75 (based on the center location of each rubber mount 8) are also situated outwardly from the circle of rotation described by the grip portion 31 during turning of the steering wheel 3, with respect the axis of turning of the steering wheel 3 (see FIG. 4).

In this embodiment, since the mounting portions 72–75 are formed with identical size and identical length, the fastener portions of the mounting portions 72–75 are situated equidistant from the turning axis O of the steering wheel 3. Additionally, since the rubber mounts 8 installed in the mounting holes 72a–75a of the mounting portions 72–75 employ the same arrangement, the rubber elastic bodies 83 have the same spring constant in the direction of turning of the steering wheel 3.

The steering apparatus of this embodiment with the arrangement described above is elastically supported with the fastener portions at all locations of the mounting portions 72–75 of the housing 7 fastened onto the body 9 via the rubber mounts 8, and the rubber mounts 8 are disposed such that spring constant is high in the direction of turning of the steering wheel 3. Thus, the driver is afforded good operating feel, and transmission of unpleasant noise vibration from the body 9 side to the steering wheel 3 via the mounting portions 72–75 of the housing 7 can be effectively reduced.

In particular, in this embodiment, since the rubber mounts 8 are arranged such that the spring constant in the vertical direction of the vehicle is about one-half or less the spring constant in the direction of turning of the steering wheel 3, good operating feel and good reduction of noise vibration can be assured.

Additionally, in this embodiment, since the fastener portions of the mounting portions 72–75 are situated outwardly from the circle of rotation described by the grip portion 31 during turning of the steering wheel 3, with respect the axis of turning of the steering wheel 3, higher rigidity in the direction of turning of the steering wheel 3 can be readily assured.

Further, since the fastener portions of the mounting portions 72–75 are situated within ranges of 20°–70° and 110°–160° from a horizontal axis P in the clockwise direction about the turning axis O of the steering wheel 3, stiffer rigidity is provided in the direction of turning of the steering wheel 3 and operating feel is improved, as well as providing softer rigidity in the vehicle vertical direction and lateral direction so as to be able to better reduce noise vibration.

Yet further, since the fastener portions of the mounting portions 72–75 are situated equidistant from the turning axis O of the steering wheel 3, and the rubber elastic bodies 83 have the same spring constant in the direction of turning of the steering wheel 3, the occurrence of translational motion of the steering wheel 3 (steering apparatus), which can bring discomfort to the driver, can be prevented consistently.

It is also to be understood that the present invention may be embodied with various other changes, modifications and improvements, which may occur to those skilled in the art, without departing from the spirit and scope of the invention defined in the following claims.

What is claimed is:

1. A steer-by-wire vehicle steering apparatus, comprising:
a housing having mounting portions fastened at respective fastener portions thereof to a vehicle body side at multiple locations;
a steering shaft one end of which is rotatably retained within the housing;
an operating member fastened to an other end of the steering shaft that projects from the housing, the operating member being rotatable together with the steering shaft; and
a control portion electrically connected to a sensor that senses a manipulated variable of the operating member, for controlling steering of wheels in response to operation of the operating member;
wherein:
the fastener portions of the mounting portions are all disposed about a turning axis of the operating member, and the housing is elastically supported with the fastener portions of the mounting portions all fastened to the body side via rubber elastic bodies;
the rubber elastic bodies in the fastener portions exhibit a highest overall spring constant in a direction of turning operation among every axis perpendicular to the operating member;
the fastener portions of the mounting portions are situated outward of a circle of rotation described by a grip portion of the operating member during turning of the operating member, with respect the turning axis of the operating member; and
the fastener portions of the mounting portions are established within ranges of 20°–70° and 110°–160° from a horizontal axis P in a clockwise direction about the turning axis of the operating member.

2. A steer-by-wire vehicle steering apparatus, comprising:
a housing having mounting portions fastened at respective fastener portions thereof to a vehicle body side at multiple locations;
a steering shaft one end of which is rotatably retained within the housing;
an operating member fastened to an other end of the steering shaft that projects from the housing, the operating member being rotatable together with the steering shaft; and
a control portion electrically connected to a sensor that senses a manipulated variable of the operating member, for controlling steering of wheels in response to operation of the operating member;
wherein:
the fastener portions of the mounting portions are all disposed about a turning axis of the operating member, and the housing is elastically supported with the fastener portions of the mounting portions all fastened to the body side via rubber elastic bodies;
the rubber elastic bodies in the fastener portions exhibit a highest overall spring constant in a direction of turning operation among every axis perpendicular to the operating member; and
K and L meet Equation (1):

$$K_1 \times L_1 = K_2 \times L_2 = \ldots = K_n \times L_n \tag{1}$$

where L is a radial distance from the turning axis of the operating member to each of the fastener portions and K is a spring constant of each of the rubber elastic bodies in the turning direction of the operating member.

3. The steer-by-wire vehicle steering apparatus according to claim 2, wherein the relationships $L_1 = L_2 = \ldots = L_n$ and $K_1 = K_2 = \ldots = K_n$ satisfied in Equation (1).

4. The steer-by-wire vehicle steering apparatus according to claim 1, wherein the rubber elastic bodies have a spring constant in a vertical direction of the vehicle that is less than or equal to about one-half a spring constant in the turning direction of the operating member.

5. A mounting structure for mounting a steer-by-wire vehicle steering apparatus on a vehicle body side, comprising;
a housing for rotatably retaining therein one end of a steering shaft of the steering apparatus, while retaining therein an actuator for exerting reactive force in order to impart reactive force in response to turning of an operating member fastened to an other end of the steering shaft that projects from the housing and is rotatable together with the steering shaft; and
a plurality of mounting portions disposed about a turning axis of the operating member so as to extend diametrically outwardly, the mounting portions being adapted to be fastened at respective fastener portions thereof to a vehicle body side at multiple locations, at least one of the fastener portions of the mounting portions being fastened to the body side via a rubber elastic body so that the housing is elastically supported on the body side;

wherein:

the fastener portions of the mounting portions are disposed about a turning axis of the operating member, and the housing is elastically supported with the fastener portions of the mounting portions all arranged to be fastened to the body side via rubber elastic bodies;

the rubber elastic bodies in the fastener portions exhibit a highest overall spring constant in a direction of turning operation among every axis perpendicular to the operating member; and the fastener portions of the mounting portions are established within ranges of 20°–70° and 110°–160° from a horizontal axis P in a clockwise direction about the turning axis of the operating member.

6. A mounting structure for mounting a steer-by-wire vehicle steering apparatus on a vehicle body side, comprising:

a housing for rotatably retaining therein one end of a steering shaft of the steering apparatus, while retaining therein an actuator for exerting reactive force in order to impart reactive force in response to turning of an operating member fastened to an other end of the steering shaft that projects from the housing and is rotatable together with the steering shaft; and a plurality of mounting portions disposed about a turning axis of the operating member so as to extend diametrically outwardly, the mounting portions being adapted to be fastened at respective fastener portions thereof to a vehicle body side at multiple locations, at least one of the fastener portions of the mounting portions being fastened to the body side via a rubber elastic body so that the housing is elastically supported on the body side;

wherein:

the fastener portions of the mounting portions are all disposed about a turning axis of the operating member, and the housing is elastically supported with the fastener portions of the mounting portions all arranged to be fastened to the body side via rubber elastic bodies;

the rubber elastic bodies in the fastener portions exhibit a highest overall spring constant in a direction of turning operation among every axis perpendicular to the operating member; and K and L meet Eciuation (1):

$$K_1 \times L_1 = K_2 \times L_2 = \ldots = K_n \times L_n \qquad (1)$$

where L is a radial distance from the turning axis of the operating member to each of the fastener portions and K is a spring constant of each of the rubber elastic bodies in the turning direction of the operating member.

7. The mounting structure according to claim 6, wherein the relationships $L_1 = L_2 = \ldots = L_n$ and $K_1 = K_2 = \ldots = K_n$ are satisfied in Equation (1).

8. The mounting structure according to claim 5, wherein the rubber elastic bodies have an overall spring constant in a vertical direction of the vehicle that is less than or equal to about one-half a spring constant in the turning direction of the operating member.

9. The steer-by-wire vehicle steering apparatus according to claim 2, wherein the rubber elastic bodies have a spring constant in a vertical direction of the vehicle that is less than or equal to about one-half a spring constant in the turning direction of the operating member.

10. The mounting structure according to claim 6, wherein the rubber elastic bodies have an overall spring constant in a vertical direction of the vehicle that is less than or equal to about one-half a spring constant in the turning direction of the operating member.

* * * * *